March 10, 1942.  R. E. FEARON  2,275,748
WELL SURVEY METHOD AND APPARATUS
Filed March 28, 1940
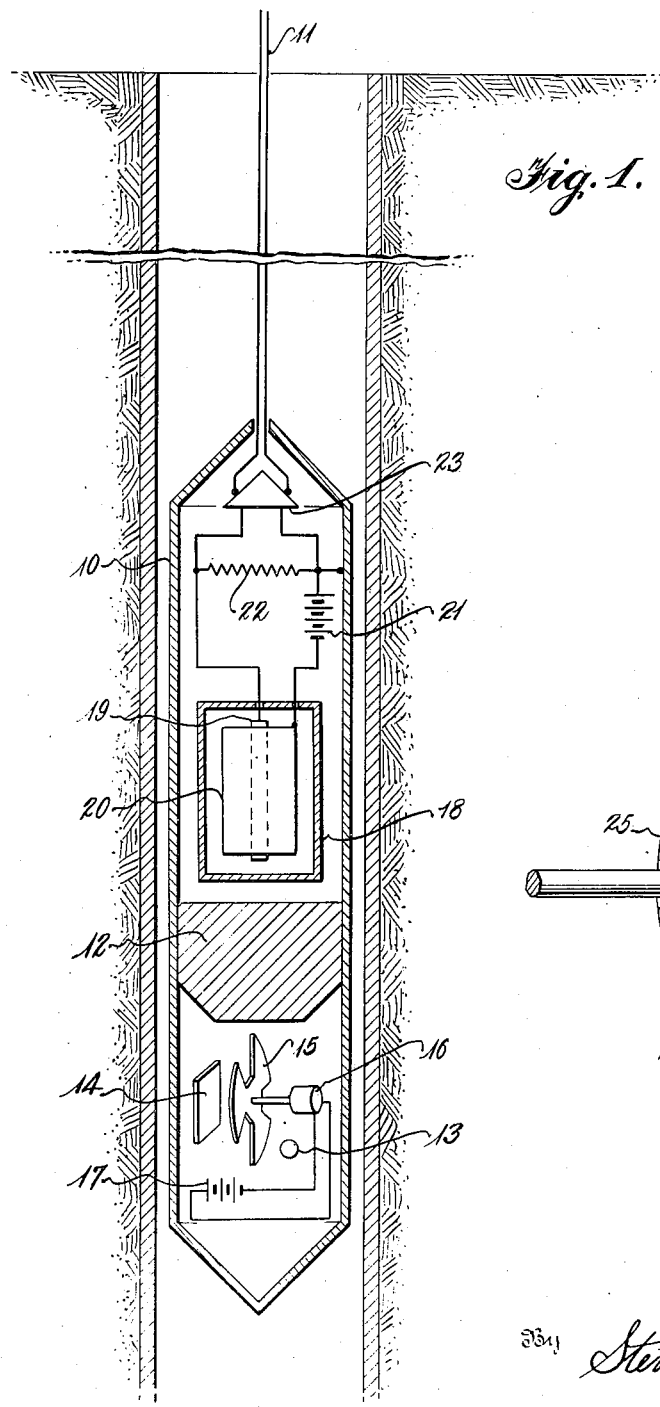
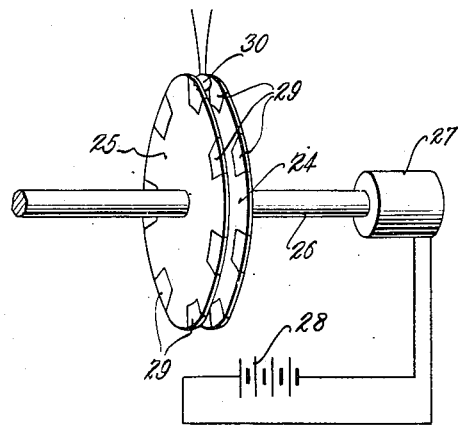
Inventor
Robert E. Fearon
By Stevens and Davis
Attorneys Patented Mar. 10, 1942

2,275,748

UNITED STATES PATENT OFFICE 2,275,748

WELL SURVEY METHOD AND APPARATUS

Robert Earl Fearon, Tulsa, Okla., assignor to Well Surveys, Incorporated, Tulsa, Okla., a corporation of Delaware Application March 28, 1940, Serial No. 326,510

18 Claims. (Cl. 250—83.6)

This invention relates to geophysical prospecting and more particularly to the determination of the nature of subsurface strata, in situ, by observation of the effect of neutron bombardment on the said strata.

In the particular branch of geophysical prospecting to which this invention is related considerable actual work has already been done on the measurement of the radioactivity of subsurface strata by lowering an ionization chamber into a drill hole or other opening in the earth so that it will lie adjacent to the strata to be studied and then transmitting electrical currents indicative of the measurements made by the ionization chamber to the surface for recording. It has also been at least proposed and sufficient experimental work done to indicate that it can be accomplished, to bombard the strata surrounding a drill hole or other opening in the earth with neutrons and simultaneously measure the radioactive phenomenon resulting from this bombardment.

The phenomena so measured may be secondary radiations in the nature of gamma rays emitted from the surrounding formation, may be neutrons scattered by the surrounding formation and returned to the measuring instrument, may be "slow" neutrons which were originally faster neutrons from the bombarding source but which have been slowed down by encountering hydrogen or hydrogenaceous material in the surrounding strata and have either before or after their slowing down been scattered and directed back towards the measuring instrument. Still other types of radioactive phenomena may be caused and measured in a similar manner.

In all of these processes difficulties arise for two important reasons. In the first place, most subsurface strata exhibit considerable radioactivity of their own and it is difficult to make a measurement that is the result of artificial radiation without having included in that measurement the effect of the natural radioactivity of the strata itself. Further, in the preferred type of radioactivity detecting instrument, which is an ionization chamber containing a pair of electrodes and a gas under relatively high pressure, the measurement is indicated by a relatively small variation in a very small, substantially constant current that flows through the ionization chamber. To get this current to the surface where it can be recorded it is necessary to amplify it and transmit it over a relatively long length of conductor. Due to the inherent instability of direct current amplifiers and the difficulty of transmitting small direct currents it has been necessary to convert the small direct currents from the detectors or measuring instruments into alternating currents and amplify these alternating currents in the drill hole before attempting to transmit them to the surface for recording. Difficulty has been encountered even in doing this because of the relatively large amount of equipment that it has been necessary to lower into the earth and because of the commutator ripples and other inaccuracies introduced by the commutation of the direct currents to convert them into alternating currents.

Faced with these problems the present inventor has discovered a new method and new apparatus for making measurements of induced or scattered or reflected radioactivity and this new method and apparatus provide an exceptionally simple and efficient way of avoiding the two important difficulties mentioned.

Briefly, the invention consists in alternately bombarding the surrounding formation and stopping the bombardment during the measuring operation. Thus the measuring instrument is caused to have an alternating output dependent upon the bombardment and a constant output dependent upon natural radioactivity of the surrounding strata. An amplifier arranged so as to amplify only the alternating part of the output can then be operated directly from the detector without the necessity of any commutation and the result of the natural radioactivity, being a direct current, is ignored in the amplification. The output of the amplifier is thus an alternating current correctly indicating the effect of the induced or reflected radioactivity in a form that can be readily transmitted to the surface of the earth.

Some difficulty was encountered in constructing a device that would operate in accordance with the principles of the method briefly set out above because neutrons are very penetrating and it is extremely difficult to arrange a shield that can be moved so as to interrupt the flow of neutrons rapidly enough to produce the desired alternating output for the detecting instrument. As can readily be seen, if a shield of lead several inches thick is used around the neutron source and an attempt made to place this shield around the neutron source and remove it at the rate of 60 to 100 times a second or even more rapidly the power necessary would be large and a great deal of vibration in the instrument could not be avoided.

This problem was solved, however, by a somewhat different approach. In the usual process of obtaining neutrons to bombard the surrounding strata a source of alpha rays is arranged so as to bombard beryllium, boron or the like with alpha rays and this results in the emission of neutrons from the boron or beryllium. Immediately upon the cessation of the alpha particle bombardment of the boron and beryllium, however, the emission of neutrons from the boron and beryllium ceases. Now, since alpha particles are relatively lacking in the ability to penetrate metals, it occurred to this inventor to place a moving shield between the source of alpha particles and the boron or beryllium or the like that was to generate the neutrons. By periodically removing and replacing this shield, or alternatively by arranging the alpha particle and neutron sources in some other manner so that the alpha particles would only periodically impinge upon the neutron source, it would be possible to provide an alternating source of neutrons. Accordingly, several such arrangements were devised and two such arrangements are shown in the accompanying drawing.

For the purposes of illustration and to give a more complete understanding of the details and advantages of the present invention specific embodiments are shown in the accompanying drawing and these embodiments are described in detail hereafter. These are not the only embodiments that can be used however, and numerous others will readily occur to those skilled in the art. Furthermore, the principles of this invention are applicable not only to the simple measurement of secondary gamma rays or the like excited by neutron bombardment of the surrounding formations but are equally applicable to any other type of exploring method in which the surrounding formation is bombarded with some type of radioactive radiation and it is desired to measure the resultant effect.

Conceivably, a source of gamma rays or of protons or of any one of a number of other types of radioactive radiation might be used to bombard the surrounding strata and the bombardment might be interrupted in accordance with the general principles of this invention. The radiations measured upon their return to the drill hole or other opening might be gamma rays, neutrons, either fast or slow, protons or any other radiations that do return and can be measured. The measurement may be of the intensity of the returning radiations or it may be of the spectral distribution of the radiations or of some other characteristic which they may have. To any of these processes the principles of the present invention will apply and it is contemplated that they be so applied insofar as that application comes within the scope of the appended claims.

In the drawing,

Figure 1 is a diagrammatic illustration of a device for measuring the effect of neutron bombardment on the surrounding strata, and Figure 2 is a diagrammatic illustration of a part of the same device modified to include a different type of bombarding mechanism.

As illustrated in Figure 1, the principles of this invention may be practiced by a device which consists of a tubular shaped capsule or housing 10 adapted to be lowered into a drill hole or other opening in the ground at the end of a cable 11 which serves to support the housing and carry currents indicative of the results of the measurements to the surface of the earth where they are recorded by a recorder which is not shown in the drawing. Within the housing 10 which is preferably cylindrical in shape and of small enough diameter so that it can be lowered into a drill hole, is a measuring instrument for measuring the intensity of the gamma rays that reach it, and a source of neutrons so arranged as to bombard the adjacent strata from which will come the gamma radiations to be detected by the measuring instrument. Separating the two parts of the device is a lead block or shield 12 which lies in the housing 10 between the two parts of the device and is of sufficient thickness so that gamma rays or streams of neutrons will not penetrate through it and affect the measuring instrument.

The source of bombarding neutrons consists of a source of alpha rays 13 and a plate 14, of or containing boron, beryllium or some other material that will emit neutrons upon exposure to alpha radiations. Among suitable sources of alpha rays are masses of radium or polonium, or entrapped radon. Positioned between the source of alpha particles 13 and the plate 14 is a revolving shutter 15, formed of material opaque with respect to alpha rays, driven by a motor 16 which can be powered by any suitable source such as a battery 17. As the shutter 15 revolves the alpha rays from the source 13 are periodically permitted to fall on the neutron generating plate 14 and when this happens neutrons are projected into the surrounding strata and induce radiations or are scattered and in part returned to operate the measuring instrument.

The measuring instrument consists of an ionization chamber 18 preferably containing argon under ground 1500 to 2000 pounds per square inch pressure and also containing a pair of electrodes 19 and 20. The inner electrode 19 is preferably an iron rod about six inches long and the outer electrode 20 is preferably a sheet iron sleeve about two inches in diameter surrounding and insulated from the rod.

Insulated and sealed connections lead through the wall of the ionization chamber, one from the outer electrode 20 to the negative side of a battery 21 and the other through a resistor 22 to the positive side of the same battery. The resistor 22 preferably has a resistance of around $10^{12}$ ohms. The positive side of the battery is preferably grounded to the case 10.

An amplifier 23 has its inputs connected across the resistor 22 where it will be affected by the potential drop across the resistor. The potential drop itself is dependent upon the flow of current through the ionization chamber and hence upon the ionization which the gamma rays impinging upon it produce. The amplifier 23 is of the alternating current type so that any constant potential drop across the resistor which results from the relatively steady action of the natural radioactivity of the surrounding earth is ignored. The resultant alternating current from the amplifier 23 passes up through the cable 11 and is recorded on the surface of the earth by a suitable recorder equipment such as that shown in this inventor's application of November 10, 1938, to which has been assigned Serial Number 239,781.

As an alternative form of neutron bombarding mechanism there may be provided a device of the type shown in Figure 2 which consists of a pair of disks 24 and 25 both mounted on the shaft 26 and driven by a motor 27 powered by any suitable source such as a battery 28. In the outer edges of these disks alternate sectors 29 are provided which sectors are of a material which will produce neutrons upon bombardment by alpha particles, for example, beryllium or boron or some composition containing one or more of these metals either as metals or in the form of their salts or other compounds. A source of alpha particles 30 is then suspended between the outer edges of the two disks and the disks are rotated by the action of the motor. When the neutron generating sections of the two disks are alongside of the source of alpha particles neutrons are generated but when they pass on and the other portion of the disks come alongside of the alpha particle source then substantially no neutrons are generated for the remainder of the disk is made of iron or lead or some other material that does not generate neutrons upon being bombarded with alpha particles. Obviously, the disks 24 and 25 can be shaped in any way desired to receive the maximum radiation possible from the source of alpha particles, that is they can be shaped so as to nearly surround the alpha particle source if so desired.

It will immediately be apparent to those skilled in the art that many modifications of the principles and details of this invention can be made without departing from the spirit thereof. For example, the motor which drives the shutter or rotating disk can be powered by alternating current from the surface of the ground or from the battery that furnishes current to the ionization chamber. A null system of conveying the measurements to the surface of the ground may be used by employing the principles of an application filed by Serge A. Scherbatskoy on June 16, 1939 and which has been assigned the Serial Number 299,767. Obviously, in such a case the application of the principles would be somewhat simplified because it would not be necessary to commutate the current from the ionization chamber.

The principles of this invention may also be applied in conjunction with the transmission system of this applicant's own applications Serial Numbers 311,218 and 311,219, both filed December 27, 1939. Furthermore, the principles of the invention described in application Serial Number 288,456 filed August 4, 1939, by Serge A. Scherbatskoy may also be applied in conjunction with this invention to eliminate errors due to nearby sources of radioactivity and specified in that application. Still further, the principles of this inventor's application Serial Number 311,217 filed December 27, 1939, may be applied to avoid lag in the transmission system.

In some instances it may be desirable to measure the spectral distribution of the gamma rays rather than their intensity or to measure separately both gamma rays and neutrons returning to the measuring instrument. In still other instances it may be desirable to radiate or bombard with "fast" neutrons and measure the "slow" neutrons returning. Any or all of these things may be done by combining the teaching of this invention with the teachings respectively of application Serial Number 323,239, filed March 9, 1940, by Jacob Neufeld; application Serial Number 325,880 filed March 25, 1940, by this inventor or the application Serial Number 323,981 filed March 14, 1940, also by this inventor.

The foregoing possibilities are mentioned merely to give examples of the possible modifications that are expected to be made by any one skilled in the art and not in any sense as attempting to outline all the possible uses of this invention.

I claim:

1. An apparatus for geophysical prospecting that comprises a sealed casing adapted to be lowered into an opening in the earth, a source of alpha particles within said casing, a material within said casing that will emit neutrons upon being subjected to radiation with alpha particles, a shutter between said source of alpha particles and said neutron emitting material, means to drive said shutter so as to periodically interrupt the radiation of said neutron emitting material with alpha particles, an ionization chamber sensitive to gamma rays within said casing, a shield between said neutron emitting material and said ionization chamber, a source of potential and a resistor connected in series with the electrodes of said ionization chamber, an amplifier having its input connected across said resistor and means for conveying the output of said amplifier to the surface of the earth for recording.

2. An apparatus for geophysical prospecting that comprises a sealed casing adapted to be lowered into an opening in the earth, a source of alpha particle radiation within said casing, at least one element capable of emitting neutrons upon radiation with alpha particles also within said casing, means to cause said neutron emitting element to be periodically subjected to alpha radiations from said alpha radiation source, means to detect radioactive radiations in said casing, and a shield between said neutron emitting source and said detecting means.

3. An apparatus for geophysical prospecting that comprises a sealed casing adapted to be lowered into an opening in the earth, a disk in said opening made up of sectors that will emit neutrons upon exposure to alpha particle radiation and other sectors that will not emit neutrons upon such exposure, means to rotate said disk, a source of alpha particles located adjacent said disk where the various sectors will pass it during the rotation of the disk and thus cause intermittent emission of neutrons from said disk, means to detect radiations returning to said casing and a shield between said neutron emitting mechanism and said detecting means.

4. A method of geophysical prospecting that comprises subjecting a formation about which information is desired to the action of pulsating radioactive radiation having a frequency corresponding to the frequency of an alternating current which may be amplified by an alternating current amplifier, and measuring the radioactive radiations coming from said formation.

5. A method of geophysical prospecting that comprises subjecting a formation about which information is desired to the action of pulsating radioactive radiation having a frequency corresponding to the frequency of an alternating current which may be amplified by an alternating current amplifier, and measuring the radioactive radiation coming from said formation, said pulsating radioactive radiation being generated by permitting a primary radioactive radiation to periodically impinge upon a substance that will generate a secondary radioactive radiation under the influence of said primary radiation.

6. A method of geophysical prospecting that comprises subjecting a formation about which information is desired to the action of pulsating radioactive radiation having a frequency corresponding to the frequency of an alternating current which may be amplified by an alternating current amplifier, and measuring the radioactive radiation coming from said formation, said pulsating radioactive radiation being of a relatively penetrating nature and being generated by permitting a relatively less penetrating radiation to fall periodically upon a substance which will generate said penetrating radiation upon activation by said less penetrating radiation.

7. A method of well logging that comprises subjecting formations adjacent a well bore at various depths therein to the action of a pulsating radioactive radiation having a frequency corresponding to the frequency of an alternating current which may be amplified by an alternating current amplifier, measuring the radioactive radiation coming from the formations and correlating the measurements of radioactive radiation from the formation with measurements of the depth of the formation.

8. A method of geophysical prospecting that comprises subjecting a formation about which information is desired to the action of pulsating neutron radiation having a frequency corresponding to the frequency of an alternating current which may be amplified by an alternating current amplifier, and measuring the radioactive radiation coming from said formation.

9. A method of geophysical prospecting that comprises subjecting a formation about which in formation is desired to the action of pulsating neutron radiation having a frequency corresponding to the frequency of an alternating current which may be amplified by an alternating current amplifier, and measuring the radioactive radiation coming from said formation, said pulsating neutron radiation being generated by permitting a primary radiation to impinge on a substance that generates neutrons under the influence of said primary radiation.

10. A device for geophysical prospecting that comprises means to subject a formation about which information is desired to the action of pulsating radioactive radiation at a frequency corresponding to the frequency of an alternating current which may be amplified by an alternating current amplifier, and means for measuring the radioactive radiation coming from said formation.

11. A device for geophysical prospecting that comprises means to subject a formation about which information is desired to the action of pulsating radioactive radiation at a frequency corresponding to the frequency of an alternating current which may be amplified by an alternating current amplifier, and means for measuring the radioactive radiation coming from said formation, said means for subjecting the formation to pulsating radioactive radiation comprising a means to generate a primary radiation and a substance positioned to receive said primary radiation which substance will generate a secondary radioactive radiation under the influence of the primary radiation.

12. A device for geophysical prospecting that comprises means to subject a formation about which information is desired to the action of pulsating radioactive radiation at a frequency corresponding to the frequency of an alternating current which may be amplified by an alternating current amplifier, and means for measuring the radioactive radiation coming from said formation, said means for subjecting the formation to pulsating radioactive radiation comprising a means to generate a primary radiation, a substance positioned to receive said primary radiation which substance will generate a secondary radioactive radiation under the influence of the primary radiation and means for intermittently shielding said substance from said primary radiation.

13. A device for well logging that comprises means adapted to be lowered into a well and including a source of pulsating radioactive radiation of a frequency corresponding to the frequency of an alternating current which may be amplified by an alternating current amplifier, and means for measuring the radioactive radiation coming from said formation.

14. A device for geophysical prospecting that comprises means for subjecting a formation about which information is desired to the action of a pulsating neutron radiation at a frequency corresponding to the frequency of an alternating current which may be amplified by an alternating current amplifier, and means for measuring the radioactive radiation coming from said formation.

15. A device for geophysical prospecting that comprises means for subjecting a formation about which information is desired to the action of a pulsating neutron radiation at a frequency corresponding to the frequency of an alternating current which may be amplified by an alternating current amplifier, means for measuring the radioactive radiation coming from said formation, said means for subjecting the formation to pulsating neutron radiation comprising means for generating a primary radioactive radiation of relatively low penetrating power, a substance arranged to receive said primary radiation, which substance will generate neutrons under the influence of primary radiation, and a shield for intermittently shielding said substance from said primary radiation.

16. A method of geophysical prospecting that comprises continuously measuring radioactive radiations from a formation about which information is desired while subjecting the formation to intermittent neutron bombardment.

17. A method of geophysical prospecting that comprises continuously measuring induced radioactive radiations from a formation about which information is desired while subjecting the formation to the action of periodically interrupted radioactive radiation.

18. A method of geophysical prospecting that comprises continuously measuring induced radioactive radiations from a formation about which information is desired while subjecting the formation to the action of periodically interrupted radioactive radiation produced by intermittently exposing a substance capable of generating secondary radiation, when exposed to a source of primary radiation, to such a source of primary radiation.

ROBERT EARL FEARON.

CERTIFICATE OF CORRECTION.

Patent No. 2,275,748.  March 10, 1942.

ROBERT EARL FEARON.

It is hereby certified that error appears in the printed specification of the above numbered patent requiring correction as follows: Page 2, second column, line 37, for the word "ground" read --around--; and that the said Letters Patent should be read with this correction therein that the same may conform to the record of the case in the Patent Office.

Signed and sealed this 21st day of April, A. D. 1942.

(Seal)

Henry Van Arsdale,
Acting Commissioner of Patents.